(12) United States Patent
Takasu et al.

(10) Patent No.: US 10,491,457 B2
(45) Date of Patent: Nov. 26, 2019

(54) CONTROL SYSTEM, CONTROL METHOD OF A CONTROL SYSTEM, AND CONTROL DEVICE

(71) Applicant: Seiko Epson Corporation, Tokyo (JP)

(72) Inventors: Kazuhiro Takasu, Shiojiri (JP); Koichiro Tsutsumi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 818 days.

(21) Appl. No.: 14/763,041

(22) PCT Filed: Jan. 28, 2014

(86) PCT No.: PCT/JP2014/000433
§ 371 (c)(1),
(2) Date: Jul. 23, 2015

(87) PCT Pub. No.: WO2014/119290
PCT Pub. Date: Aug. 7, 2014

(65) Prior Publication Data
US 2015/0365272 A1    Dec. 17, 2015

(30) Foreign Application Priority Data

Jan. 30, 2013  (JP) .................................. 2013-016053
Jan. 30, 2013  (JP) .................................. 2013-016054
Jan. 30, 2013  (JP) .................................. 2013-016058

(51) Int. Cl.
*H04L 12/24*        (2006.01)
*G06Q 20/20*        (2012.01)
(Continued)

(52) U.S. Cl.
CPC ....... *H04L 41/0672* (2013.01); *G06Q 20/202* (2013.01); *H04L 43/0847* (2013.01);
(Continued)

(58) Field of Classification Search
CPC ............ H04L 41/0672; H04L 43/0847; H04L 67/145; H04L 67/146; G06Q 20/202; G07G 1/14
See application file for complete search history.

(56) References Cited

U.S. PATENT DOCUMENTS

2003/0236905 A1* 12/2003 Choi ...................... H04L 29/06
                                                     709/231
2005/0080906 A1*  4/2005 Pedersen ................. H04L 63/08
                                                     709/228
(Continued)

FOREIGN PATENT DOCUMENTS

EP    0 926 608 A2    6/1999
JP    02-067671 A     3/1990
(Continued)

OTHER PUBLICATIONS

"Web applications—POS web based advantages/disadvantages over desktop app". Stack Overflow, Nov. 19, 2012, retrieved from http://stackoverflow.com/questions/6075880/pos-web-based-advantages-disadvantages-over-desktop-app (2 pgs.).

(Continued)

*Primary Examiner* — Philip J Chea
*Assistant Examiner* — Robert B McAdams
(74) *Attorney, Agent, or Firm* — Foley & Lardner LLP

(57) ABSTRACT

In a control system in which a terminal with a browser and a control device communicate through a network, the system and control device are made compatible with a configuration in which the devices communicate through a network. When establishing a connection between a tablet device 10 and a control device 11 in the POS system 1, both devices store identification information related to the connection, (Continued)

and when reconnecting after the connection is broken, reconnect based on the identification information stored by the devices.

3 Claims, 10 Drawing Sheets

(51) Int. Cl.
  *H04L 12/26*      (2006.01)
  *H04L 29/08*      (2006.01)
  *G07G 1/14*       (2006.01)

(52) U.S. Cl.
  CPC .......... *H04L 67/145* (2013.01); *H04L 67/146* (2013.01); *G07G 1/14* (2013.01)

(56) References Cited

U.S. PATENT DOCUMENTS

| | | |
|---|---|---|
| 2007/0083618 A1 | 4/2007 | Kim |
| 2009/0191879 A1* | 7/2009 | Ichikawa .............. H04W 36/18 455/442 |
| 2010/0150320 A1* | 6/2010 | Lingafelt ............ H04L 12/1831 379/68 |
| 2010/0306547 A1 | 12/2010 | Fallows et al. |
| 2013/0054818 A1* | 2/2013 | Furuta ................... H04L 67/145 709/227 |

FOREIGN PATENT DOCUMENTS

| | | |
|---|---|---|
| JP | 05-073769 A | 3/1993 |
| JP | 2005-108121 A | 4/2005 |
| JP | 2007-109236 A | 4/2007 |
| JP | 2007-508617 A | 4/2007 |
| JP | 2008-077541 A | 4/2008 |
| JP | 2010-273045 A | 12/2010 |
| WO | WO 2005/114489 A2 | 12/2005 |

OTHER PUBLICATIONS

Extended European Search Report dated Jan. 18, 2017 in related European Appl. 14745737.8 (16 pgs.).

* cited by examiner

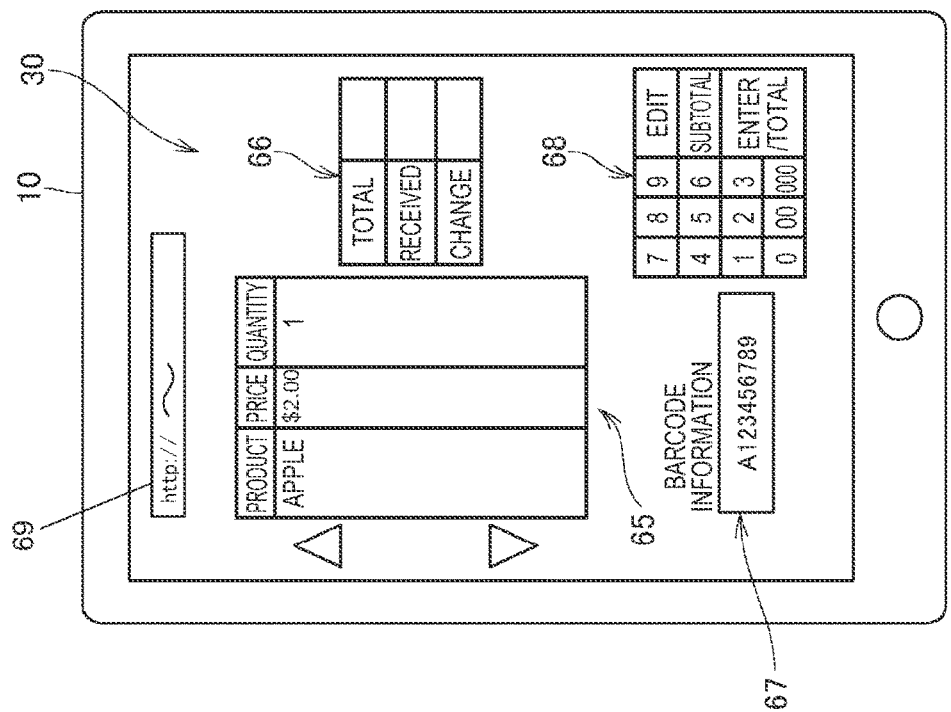
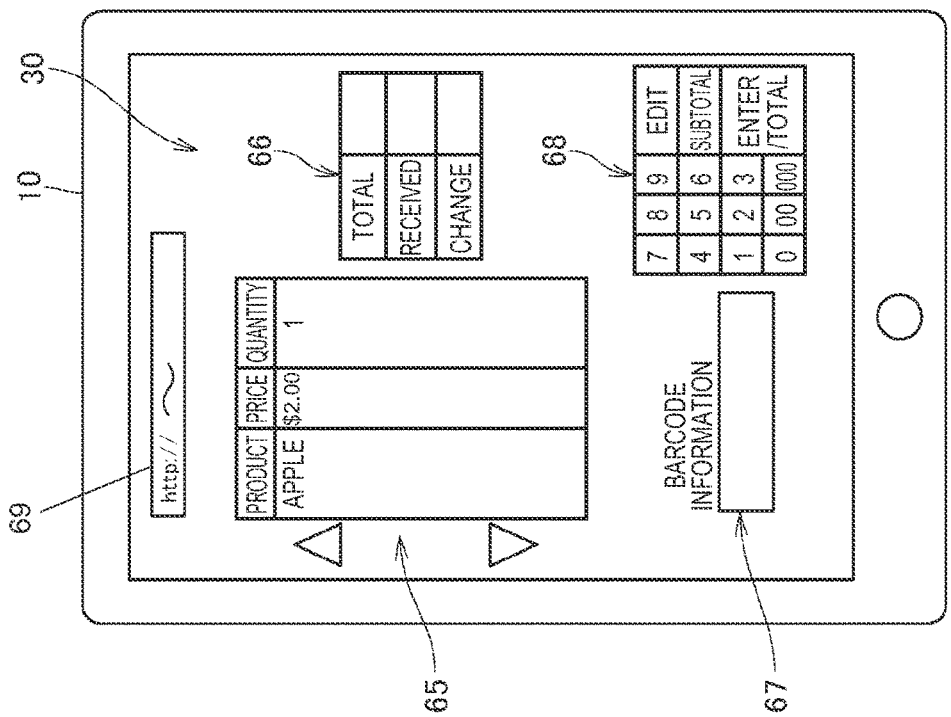
FIG. 6(B)
FIG. 6(A)

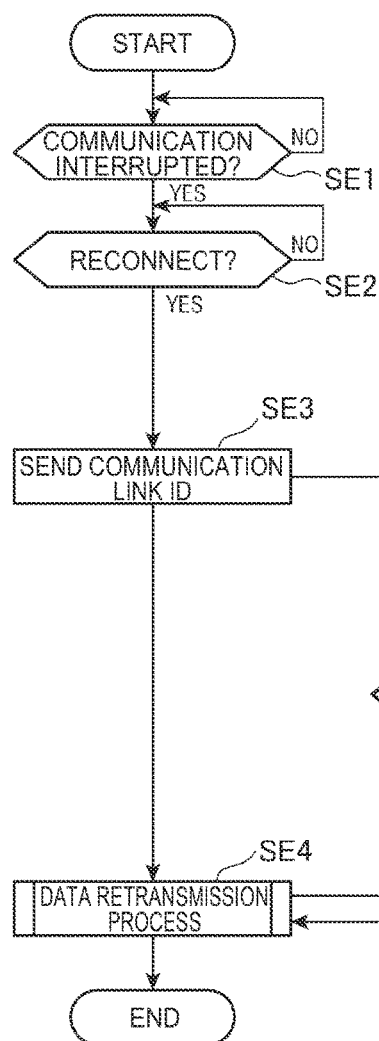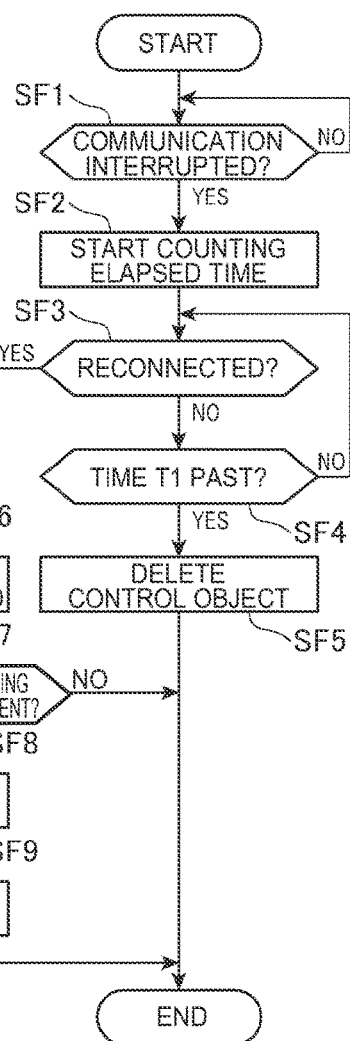

CONTROL SYSTEM, CONTROL METHOD OF A CONTROL SYSTEM, AND CONTROL DEVICE

TECHNICAL FIELD

The present invention relates to control system including a control device and a terminal, a control method of the control system, and a control device.

BACKGROUND ART

A control system (POS system) that has a control device (POS terminal) and a terminal (POS controller) connected to the POS terminal, and executes printing and other processes by these devices, is known from the literature (see, for example PTL 1). The control device and terminal in such a control system communicate through a network.

Terminals such as personal computers, tablet terminals, and notebook computers on which a browser is installed are also common.

CITATION LIST

Patent Literature

[PTL 1] JP-A-H05-73769

SUMMARY OF INVENTION

Technical Problem

To configure a system including a control device and a terminal on which a browser is installed, the system and the control device must be made compatible with a configuration in which the terminal and the control device communicate through a network.

The present invention was conceived with consideration for this problem, and an objective of the invention is to make a system and control device compatible with configurations in which these devices communicate through a network for use in a control system in which a control device and a terminal with a browser communicate through a network.

Solution to Problem

The invention is characterized by establishing a communication connection between a terminal on which a browser runs and a control device that exchanges data with the terminal; generating identification information related to the established communication connection; storing the generated identification information on the terminal and the control device; and when re-establishing a communication connection after the communication connection between the terminal and control device is broken, establishing a communication connection based on identification information related to the communication connection stored by the terminal and the control device.

Thus comprised, the terminal and control device store identification information for the connection when a connection between a terminal and control device is established, and when reconnecting after the connection is interrupted, reconnect based on the identification information. When reconnecting, reconnection that is compatible with the connection before it was interrupted is therefore possible using the identification information.

Additionally, establishing a communication connection based on identification information related to the communication connection is executed when re-establishing a communication connection within a predetermined time after the communication connection between the terminal and control device is broken.

Thus comprised, a connection can be re-established using the identification information even when communication is temporarily interrupted due to a momentary failure, for example.

To achieve the foregoing objective, a control system according to the invention includes a device that sends data; a control device including a first communication unit that communicates with the device and receives data the device sent, a device controller that assigns identification information to the data received by the first communication unit, a storage unit that stores data with the assigned identification information, and a second communication unit that sends the data with the assigned identification information; and a terminal on which a browser runs, the terminal including a connection unit that receives the data with the assigned identification information sent from the control device, a terminal storage unit that stores the identification information of the data with the assigned identification information received by the connection unit, and a terminal control unit that runs an application that processes the data with the assigned identification information.

Thus comprised, identification information is assigned to data sent from the control device to the terminal, the control device stores the transmitted data, and the terminal stores the identification information of the received data. As a result, when the connection is broken, the identification information can be used as a key to identify data that the terminal has not received due to interruption of the connection, and the identified data can be retransmitted. In other words, a control system in which a terminal with a browser and a control device communicate through a network can be made compatible with configurations in which devices communicate through a network.

When re-establishing connection after communication between the terminal and control device is interrupted, the terminal sends the stored identification information to the control device; the device controller of the control device identifies data to which identification information not stored by the terminal is assigned based on the identification information sent from the terminal and the identification information of the data with assigned identification information stored in the storage unit; and the second communication unit of the control device sends data with assigned identification information that is not stored in the terminal.

Thus comprised, the identification information can be used to determine data that the terminal has not received when reconnecting after the connection is broken.

In addition, the identification information assigned by the device controller of the control device is rule-based information; and based on the rule of the identification information, the device controller identifies data with assigned identification information not stored by the terminal.

Thus comprised, the control device can identify data the terminal has not received by a simple means using the rule-based regularity of the identification information instead of executing a process of the terminal sending identification information for data received within a specific period to the control device, and the control device identifying data that the terminal has not received by comparing the received identification information and the identification information in the data with stored identification information.

The invention is further characterized by a control device assigning identification information to data sent from a connected device and storing data with the assigned identification information, and sending data with assigned identification information to a terminal; and the terminal to which the data with the assigned identification information was sent storing the identification information of the data with the assigned identification information.

Thus comprised, identification information is assigned to data output from the control device to the terminal, the control device stores the output data, and the terminal stores the identification information of the input data. As a result, when the connection is broken, the identification information can be used as a key to identify data that has not been input to the terminal when the connection is interrupted, and can output the identified data again.

When communication is reconnected after communication between the control device and the terminal is broken while communicating, the terminal sends the stored identification information to the control device, and the control device sends the data with identification information not stored by the terminal to the terminal based on the identification information that was sent and the identification information of data with assigned identification information that was stored.

Thus comprised, when re-connecting after the connection is broken, data that has not been input to the terminal can be identified using the identification information.

To achieve the foregoing objective, a control device according to the invention includes a first communication unit that connects to a device and communicates with the device; a second communication unit that is connected to a terminal that runs a browser and receives requests from the terminal; and a device controller that uses a control object to control the device based on a request from the terminal, and deletes the control object after holding the control object instantiated for a specific time after the communication connection with the terminal is broken.

Thus comprised, the control object is not deleted immediately when communication is interrupted, and is instead deleted after being held for a specific time. As a result, the control object is not immediately deleted when communication is temporarily interrupted unintentionally, and when communication is restored after the temporary interruption, control of the device can start using the control object that was not deleted and remains instantiated. Furthermore, because the control object is deleted after remaining instantiated for a specific time, the control object not being deleted for an unnecessarily long time and control of a device therefore not being released is prevented. In other words, with this configuration of the invention, a control system in which a terminal having a browser and a control device communicate through a network can be made compatible with a configuration in which the control device communicates with other devices through a network.

When the communication connection with the terminal is broken and communication with the terminal is then established after time exceeding a specific threshold has past, the device controller instantiates and executes a control object based on a request from the terminal.

Thus comprised, when reconnection is not successful within a specific time after communication is interrupted and a control object is therefore deleted, a control object is instantiated based on the request of the terminal, and a state enabling control of a device can be quickly established.

The control object run by the device controller converts a request sent from the terminal to data that is sent to a device through the first communication unit.

Thus comprised, a request can be output from the terminal to a device and the device can be controlled using a function of the control object.

BRIEF DESCRIPTION OF THE DRAWINGS

FIGS. 6(A) and 6(B) are an example of a user interface.

FIGS. 9(A) and 9(B) are flow charts showing the operation of a tablet terminal and a control device.

DESCRIPTION OF EMBODIMENTS

A preferred embodiment of the present invention is described below with reference to the accompanying figures.

Figure 1:
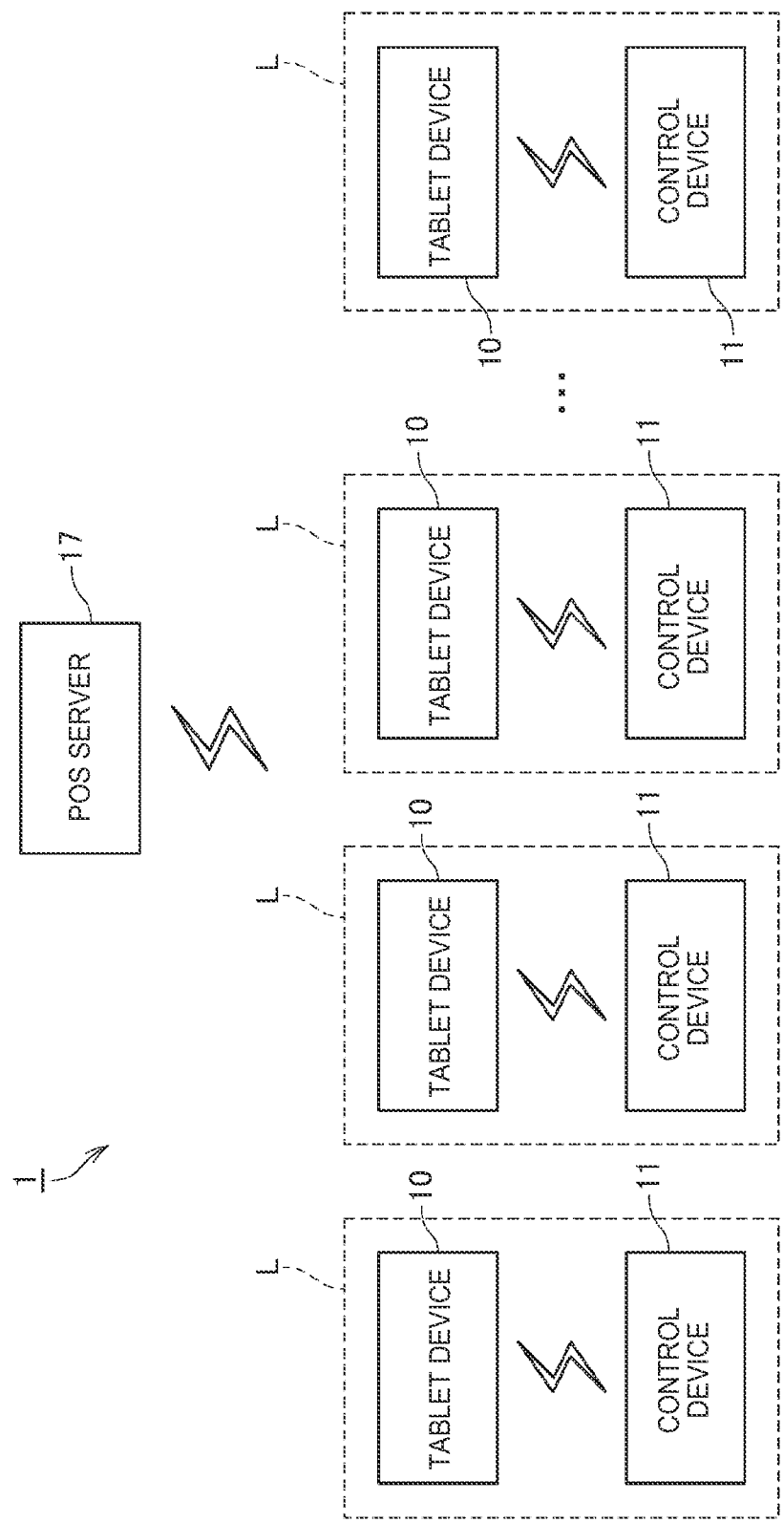
FIG. 1 shows the configuration of a POS system according to a preferred embodiment of the invention.
Figure 2:
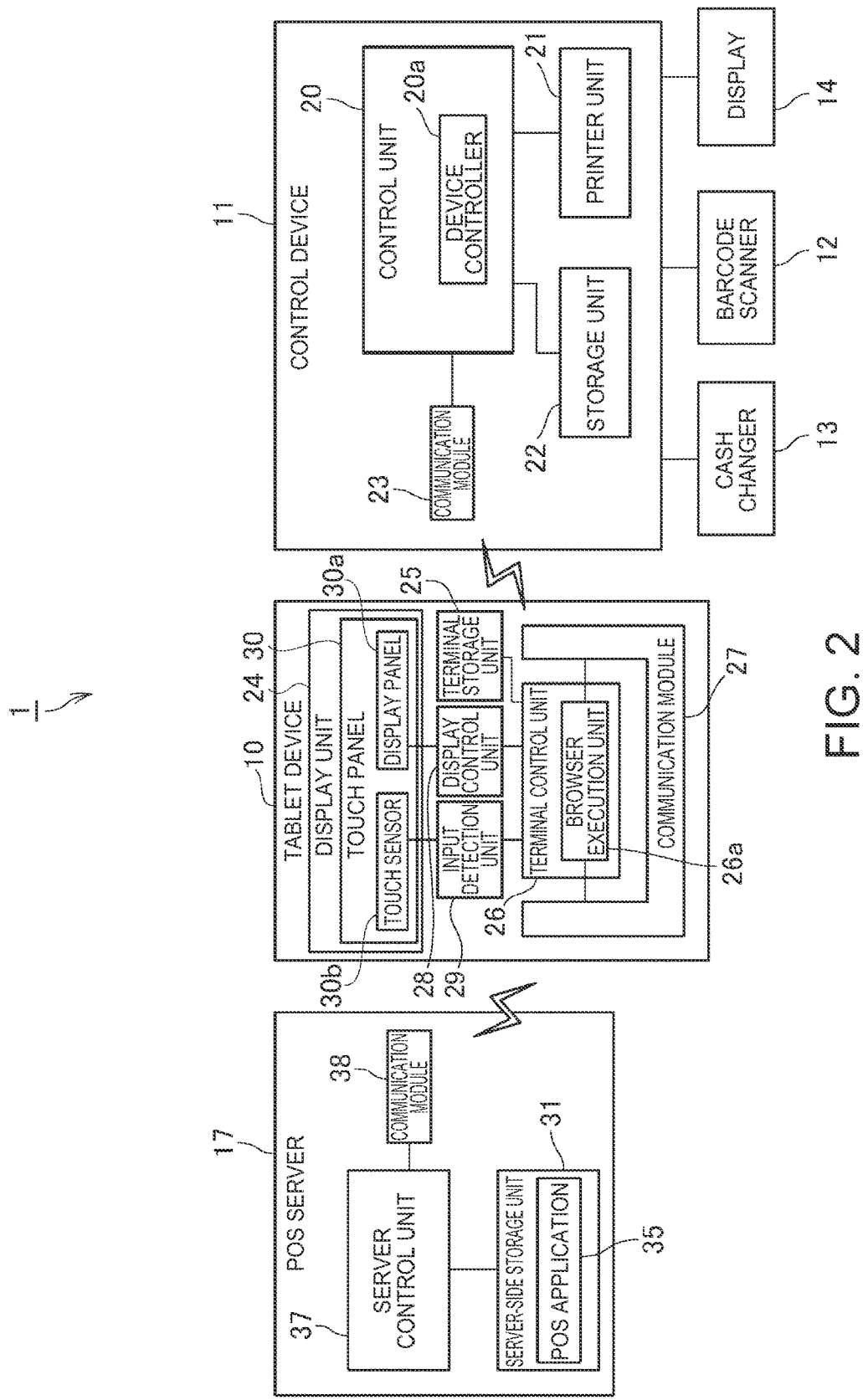
FIG. 2 is a block diagram showing the functional configuration of devices in the POS system.

FIG. 1 is a block diagram schematically showing the configuration of a POS (point-of-sale) system 1 (control system) according to a preferred embodiment of the invention. FIG. 2 is a block diagram showing the functional configuration of a tablet device 10 (terminal), control device 11, and POS server 17 in the POS system 1.

The POS system 1 is a system used, for example, in a retail store in a shopping center, a department store, or convenience store, in the food service industry such as in a restaurant, coffee shop, or bar, and in other types of businesses and facilities. The functions of the POS system 1 include, for example, managing product sales, product inventory, and sales trends in a store, processing sale transactions at checkout counters L in a store according to the products purchased by a customer, producing receipts based on the payment received from the customer, and providing transaction-related information to the customer.

Checkout counters L where sale transactions are processed are located in a store where the POS system 1 is used. A control device 11 and a tablet device 10 that communicates wirelessly with the control device 11, are installed at one checkout counter L.

The tablet device 10 is a tablet computer. More particularly as shown in FIG. 6 and described below, the tablet device 10 according to this embodiment is a computer that has a touch panel 30 covering the front display area and enables input by touch.

The tablet device 10 is a terminal used by the checkout clerk handling transactions at the checkout counter L. As described below, the tablet device 10 provides a user interface to the checkout clerk when processing a transaction at the checkout counter L.

The control device 11 is a device that functions as a device controller. As shown in FIG. 2, at least one device such as a barcode scanner 12 (device) for reading barcodes on products or product packaging, a cash changer 13 (device) for holding and managing cash, checks, or other payment instruments, and a display 14 (device) for displaying transaction data for the customer, is connected to the control device 11 as a device.

As shown in FIG. 2, the control device 11 includes a control unit 20, a printer unit 21 (device), a storage unit 22, and a communication module 23.

The control unit 20 includes CPU, ROM, RAM, and other peripheral circuits, and controls the control device 11. The control unit 20 also has a device controller 20a, but this function block is described further below.

The printer unit 21 includes a conveyance mechanism for conveying roll paper, a print mechanism that prints text and images on the roll paper using a thermal head, and a cutting mechanism for cutting the roll paper, and can produce a receipt by cutting the roll paper at a specific position after printing a receipt-related image on the roll paper.

The storage unit 22 includes EEPROM or other nonvolatile memory, and stores data rewritably and nonvolatilely.

The communication module 23 includes a module and communication control circuits, such as a network card conforming to a particular communication standard, for communicating wirelessly with the tablet device 10, and communicates wirelessly according to the specific communication standard with the tablet device 10 as controlled by the control unit 20.

The tablet device 10 includes a display unit 24, a terminal storage unit 25, a terminal control unit 26, a communication module 27, and an input detection unit 29. The terminal control unit 26 includes a display control unit 28.

The terminal storage unit 25 is EEPROM or other nonvolatile memory, and nonvolatilely stores data rewritably.

The display unit 24 has a touch panel 30. The touch panel 30 includes a display panel 30a disposed on the front of the tablet device 10, and a touch sensor 30b integrally disposed over the display panel 30a. The display panel 30a is a display such as an LCD panel, OLED panel, or e-paper display, and is driven by the display control unit 28. The touch sensor 30b is an electrostatic or pressure sensitive sensor that is overlaid on the display panel 30a, detects touches by the user's fingers or a pen-like stylus, and sends a signal indicating the position where the touch was detected to the input detection unit 29.

The display control unit 28 drives the display panel 30a based on display data received from a browser execution unit 26a described below, and displays a screen containing text or images on the display panel 30a.

The input detection unit 29 detects touch operations on the touch panel 30 based on the signals sent by the touch sensor 30b. When a touch operation is detected, the input detection unit 29 generates coordinate data containing coordinates correlating the position that was touched to a display position on the display panel 30a, and sends the coordinate data to the terminal control unit 26.

The communication module 27 includes a module and circuits, such as a network card conforming to a specific communication protocol, for communicating wirelessly with the control device 11 and POS server 17, and communicates wirelessly based on the specific protocol with the control device 11 and POS server 17 as controlled by the terminal control unit 26.

The terminal control unit 26 controls parts of the tablet device 10, and includes CPU, ROM, RAM, and other peripheral circuits. The terminal control unit 26 also includes a browser execution unit 26a that renders the function of a browser by running a browser program.

The browser execution unit 26a downloads a web page (such as an HTML file) written in a scripting language or markup language such as HTML from the POS server 17 using a function of the web browser. The downloaded web page data is stored, for example, in RAM not shown. The browser execution unit 26a reads the data of the downloaded web page, generates display data for displaying the web page, and outputs to the display control unit 28. Based on the received display data, the display control unit 28 displays a web page on the display panel 30a.

When the input detection unit 29 detects a touch operation on the touch sensor 30b, the browser execution unit 26a determines the input content based on the coordinate data received from the input detection unit 29 according to the touch operation, and the display data sent to the display control unit 28. Based on the identified input content, the browser execution unit 26a executes the appropriate process using a script function, for example.

The POS server 17 includes a server storage unit 31 that stores a database of product-related information, a sales management database, and an inventory management database, and manages the POS system 1 using these databases.

The POS server 17 includes a server control unit 37, server storage unit 31, and communication module 38.

The server control unit 37 controls parts of the POS server 17, and includes CPU, ROM, RAM, and other peripheral circuits. The server-side storage unit 31 includes a hard disk drive, EEPROM, or other nonvolatile memory, for example, and nonvolatilely stores data rewritably.

The communication module 38 includes a module and circuits, such as a network card conforming to a particular communication standard, for communicating wirelessly with the tablet device 10, and communicates wirelessly according to the specific communication protocol with the tablet device 10 as controlled by the server control unit 37.

A POS application 35 is installed on the POS server 17.

The browser execution unit 26a of the tablet device 10 executes various processes using a function of the POS application 35 on the POS server 17.

For example, the browser execution unit 26a asserts a request for an operation to the POS server 17 as needed, causes the POS application 35 to execute the process, gets the result of the process, and based on the process result executes a related process. For example, the browser execution unit 26a sends the result of reading by the barcode scanner 12 to the POS server 17, searches for the product using a function of the POS application 35, gets the result of the search, and then controls the control device 11 based on the search result to display the product information on the display 14. The browser execution unit 26a also requests calculating the total amount of the transaction, runs the POS application 35 to calculate the total, and gets the result of the calculation, and controls the control device 11 based on the calculated result to produce a receipt on which information including the total is printed.

Note that an "application that runs on a browser" is the POS application 35 or other application installed on another device with which the browser execution unit 26a can communicate. More specifically, an application that runs on a browser is an application installed on a device other than the tablet device 10, and includes applications with functions that can be used by the browser execution unit 26a. An application in this example may be an application that is started, executed, and run by another device that can communicate, or an application that is downloaded from another device to the tablet device 10 and is started, executed, and run by the tablet device 10. An application that runs on a browser also includes scripts embedded in a web page (such as an HTML file) that is read by the browser execution unit 26a, as well as programs and other software with functions that can be used by the browser execution unit 26a.

Figure 3:
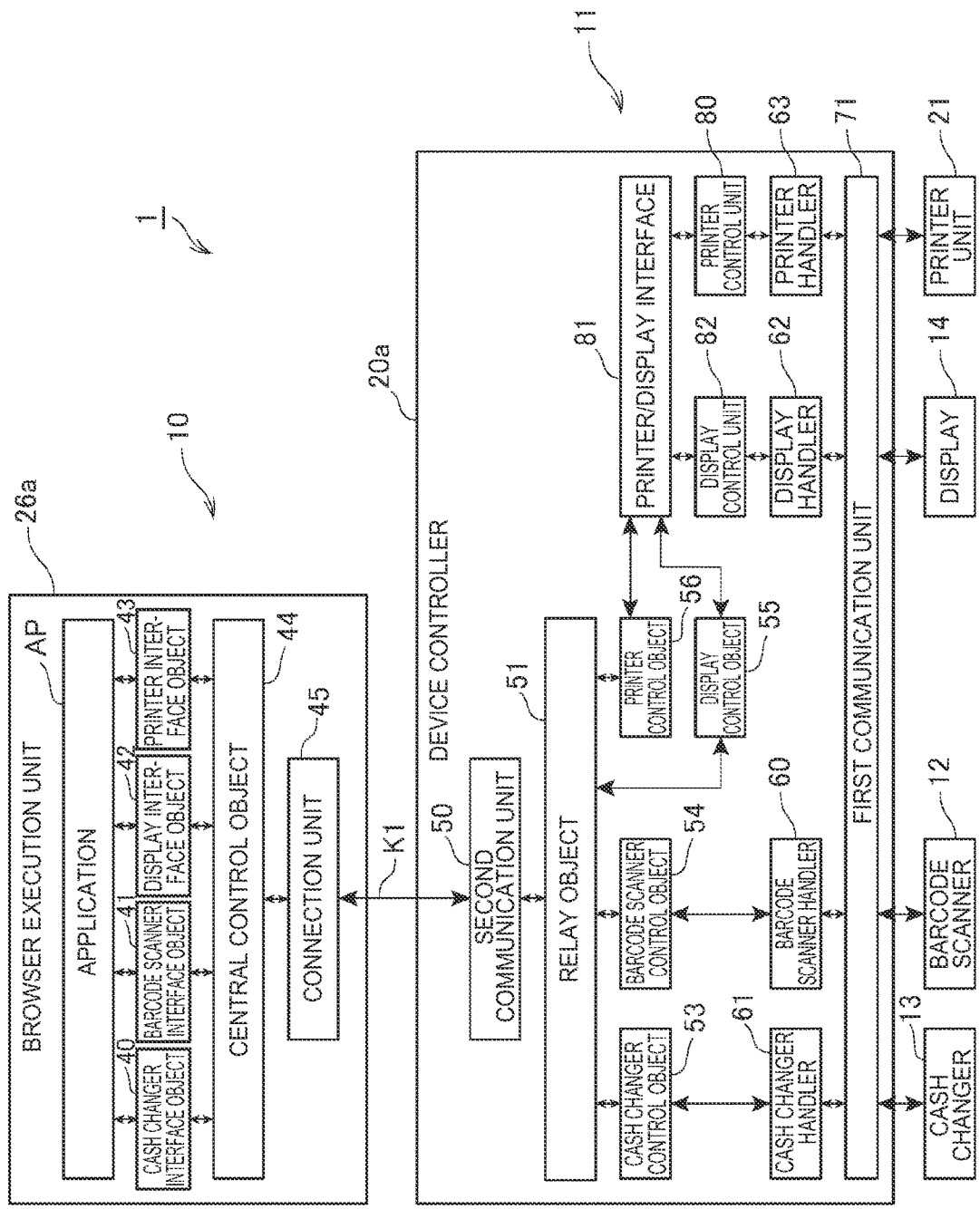
FIG. 3 is a function block diagram of the browser execution unit and the device control unit.

FIG. 3 is a more detailed function block diagram of the browser execution unit 26a of the tablet device 10, and the device controller 20a of the control device 11.

Note that for convenience of description, blocks schematically representing programs, software objects, and functions rendered by programs, and blocks representing physical devices, are shown on the same level in FIG. 3.

Note also that in this embodiment an "object" is an instance created in object-oriented programming, and more specifically means a function block defined by data and a set of methods. However, an "object" as used herein is not limited to an instance in object-oriented programming, and may be a function block that can execute a process based on an appropriate function. For example, an "object" may be a function block whose function is rendered by an application being read and executed by a CPU or other hardware resource. In this event, a configuration whereby the function of one function block is rendered by one application, a configuration whereby the functions of plural function blocks are rendered by one application, and a configuration whereby the function of one function block is rendered by plural applications, are conceivable.

As shown in FIG. 3, application AP is run by the browser execution unit 26a of the tablet device 10. As described above, an application AP conceptually includes an application that, like the POS application 35, runs on another device, an application that is downloaded from another device, a script embedded in an HTML file that is read by the browser execution unit 26a, other applications with functions that can be used by the browser execution unit 26a.

At least one of a cash changer interface object 40 (interface object), barcode scanner interface object 41 (interface object), display interface object 42 (interface object), and printer interface object 43 (interface object), can run on the browser execution unit 26a. A central control object 44 and a connection unit 45 can also run on the browser execution unit 26a.

A second communication unit 50, relay object 51, cash changer control object 53 (control object), barcode scanner control object 54 (control object), display control object 55 (control object), printer control object 56 (control object), and a first communication unit 71 can operate on the device controller 20a.

The process for instantiating and the functions of these objects and interfaces are described below with reference to the flow chart in FIG. 4.

Figure 4:
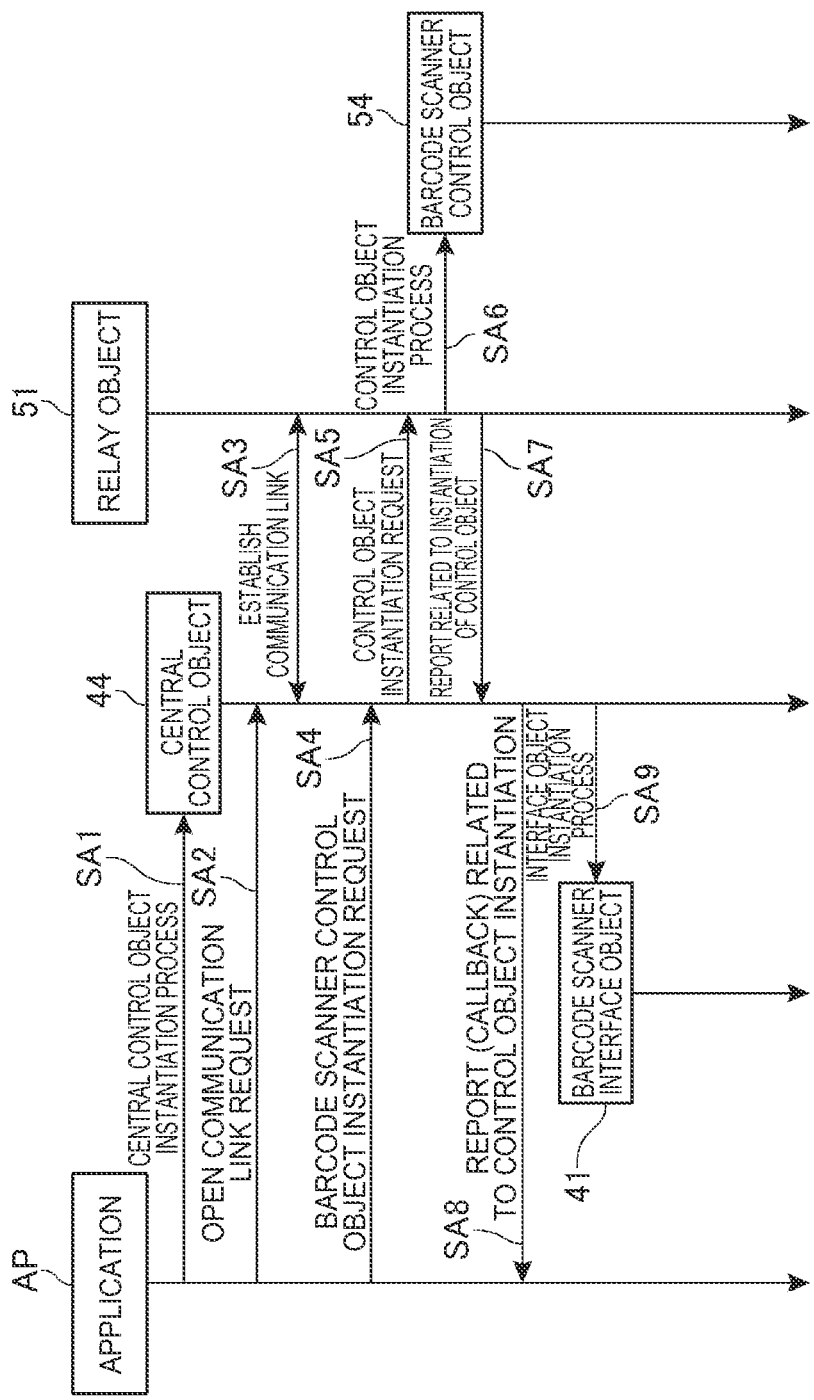
FIG. 4 is a flow chart of instantiating control and interface objects.

FIG. 4 is a flow chart of the process whereby objects are instantiated by the browser execution unit 26a and device controller 20a. More particularly, the flow chart in FIG. 4 describes a process whereby objects are created using as examples instantiating a barcode scanner interface object 41 as an example of an interface object, and a barcode scanner control object 54 as example of a control object.

Note that below "the application AP does" something means that when describing a process based mainly on the operation of the application AP, the CPU (terminal control unit 26, browser execution unit 26a) that reads and runs the application AP uses a function of the application AP to execute the process. Likewise, "the object does" something means that when describing a process based mainly on the operation of an object, the CPU (corresponding control unit) uses a function of the object to execute the process.

The application AP first executes the central control object instantiation process (step SA1). The central control object instantiation process is a process that instantiates the central control object 44. The central control object 44, as described in detail below, is an object containing methods related to controlling the POS system 1, including methods related to establishing and terminating a communication link, and methods related to instantiating and deleting control objects and interface objects.

The central control object instantiation process in step SA1 is executed, for example, by the manufacturer of the control device 11 supplying a dedicated API (application programming interface), and the application AP using a function of the API.

When a central control object 44 is instantiated by the process of step SA1, the application AP asserts an open communication link request (communication request) (step SA2).

The open communication link request (communication request) is a request to establish a logical WebSocket communication link K1 with the control device 11, and establish a state in which the devices can send and receive data based on the WebSocket standard. The open communication link request (communication request) is asserted by the application AP reading and running a dedicated method embedded in the central control object 44.

Note that WebSocket is a communication protocol enabling asynchronous duplex communication between a server and a client connected through a network. After a server and client establish a WebSocket connection CT, WebSocket enables using a dedicated protocol to send and receive data through the connection. There is, therefore, no need to establish a connection each time there is a need to send data.

The communication link K1 is a logical communication path for sending and receiving data according to the WebSocket protocol and methods between the tablet device 10 and control device 11 connected by the communication link K1. Therefore, after the tablet device 10 and control device 11 handshake and open a communication link K1, the devices can send and receive data asynchronously through the communication link K1.

In response to the open communication link request in step SA2, the central control object 44 of the tablet device 10 and the relay object 51 of the control device 11 open a communication link K1 between the connection unit 45 and second communication unit 50 (step SA3).

Note that the connection unit 45 and second communication unit 50 are WebSocket interfaces for sending and receiving data using the WebSocket standard and methods. These function blocks are instantiated using the WebSocket Socket library, for example.

The second communication unit 50 has a function for executing a process according to the WebSocket standard to send data received from the relay object 51 over the communication link K1 according to a WebSocket procedure. The second communication unit 50 also has a function for executing a process according to the WebSocket standard to send data received over the communication link K1 to the relay object 51. The connection unit 45 is similarly configured.

The relay object 51 is an object that operates on the device controller 20a. A method for establishing a communication link K1, and methods for executing processes described below, are embedded in the relay object 51.

When a communication link K1 is established, a communication link ID, which is information identifying the communication link K1, is added to the communication link K1 by a function of the central control object 44 or the relay object 51. The assigned communication link ID is stored in the tablet device 10 in a specific storage area of the terminal storage unit 25 in a form enabling referencing by the application AP. The communication link ID is also stored in the control device 11 in a specific storage area of the storage unit 22 in a form enabling referencing by the relay object 51.

By establishing a communication link K1, the tablet device 10 (terminal) and the control device 11 can communicate with each other.

Next, the application AP asserts a barcode scanner control object instantiation request (device control request) (step SA4). A barcode scanner control object instantiation request is a process requesting instantiation of a barcode scanner control object 54 that operates on the device controller 20a. Note that because instantiating a device control object establishes a state enabling controlling the corresponding device (establishes control of a device) as further described below, the process of step SA4 is a process of an application (or terminal) requesting control of a device.

Identification information (a "device ID" below) is assigned to each device connected to the control device 11 according to the type of device. In the following example, "scanner" is assigned as the device ID to the barcode scanner 12.

To instantiate a barcode scanner control object 54, the application AP specifies the device ID of the barcode scanner 12 to be controlled. As will be understood below, the relay object 51 instantiates an appropriate control object corresponding to the device to be instantiated using the specified device ID as a key.

Control objects are further described below.

A control object is an object containing methods related to controlling a device, and controls a particular device using a function of a corresponding handler. For example, the cash changer control object 53 contains a method for executing a process related to controlling the cash changer 13, and the object controls the cash changer 13 using a function of a cash changer handler 61. A handler is a function or subroutine that executes a process related to the corresponding device as requested. For example, when a barcode is read by the barcode scanner 12, the barcode scanner handler 60 gets the input result of reading the barcode, executes an interrupt process, and passes the read result (such as a numeric string) to the barcode scanner control object 54. The other handlers (cash changer handler 61, display handler 62, and printer handler 63) function similarly.

The first communication unit 71 is a device interface connected to each device, sends data sent from the control object to the device, and sends data sent from the device to the control object.

As described above, control of a device by the control device 11 is established by instantiating a control object.

In response to the barcode scanner control object instantiation request from the application AP, the central control object 44 sends a barcode scanner control object instantiation request to the relay object 51 through the communication link K1 (step SA5).

In response to this request, the relay object 51 instantiates a control object (barcode scanner control object 54 in this example) corresponding to the specified device ID (the device ID "scanner" for the barcode scanner 12 in this example) using a "new" statement, for example (step SA6).

In other words, the device controller 20a instantiates the control object, and the instantiated control object runs on the device controller 20a.

In step SA6, the relay object 51 manages the instantiated barcode scanner control object 54 relationally to the communication link ID assigned in step SA3. This also applies to the instantiation of other control objects. Because the relationship between control object communication link ID is managed by the relay object 51, the relay object 51 can know which application AP manages each control object.

This is described more specifically next using as an example a configuration in which two tablets, a first tablet and a second tablet, are connected to a single control device 11. In this example, each tablet establishes a WebSocket communication link with the control device 11. A different communication link ID is assigned to each communication link. The first tablet then instantiates a barcode scanner control object 54 in order for an application AP running on the first tablet to control the barcode scanner 12.

In this instance, the relay object 51 links and manages the barcode scanner control object 54 using the communication link ID of the communication link to the first tablet. The second tablet instantiates a cash changer control object 53 in order for an application AP running on the second tablet to control the cash changer 13. In this instance, the relay object 51 links and manages the cash changer control object 53 using the communication link ID of the communication link to the second tablet.

As a result, the relay object 51 sends data sent by the barcode scanner control object 54 to the first tablet based on the result of reading by the barcode scanner 12 through the communication link with the corresponding communication link ID, that is, sends the data to the first tablet through the communication link associated with the first tablet.

Likewise, when the application AP running on the second tablet controls the cash changer 13, and there is communication through the communication link to the second tablet, the communicated data is sent to the cash changer control object 53 corresponding to the communication link ID of the communication link. As a result of the relay object 51 thus relationally managing control objects using the associated communication link ID, control objects will not communicate through the wrong communication link even when a plurality of tablets are connected and a plurality of communication links are thus established.

When instantiation of the barcode scanner control object 54 is completed, the relay object 51 reports through the communication link K1 to the central control object 44 that instantiation of the object was completed (step SA7). The central control object 44 then passes the report to the application AP (step SA8).

Note that when the barcode scanner control object instantiation process executes in step SA4, a callback that receives the result of the process related to instantiating the control object is declared, and successful instantiation of the barcode scanner control object 54 is reported to the application AP by executing the callback function.

The central control object 44 then instantiates a barcode scanner interface object 41 corresponding to the barcode scanner control object 54 that was instantiated (step SA9).

Interface objects are described next.

An interface object functions as an interface causing an application AP to use the methods embedded in the control object related to the corresponding device when the application AP controls a device. More specifically, if when controlling one device the application AP sends information to the interface object corresponding to the one device, the interface object communicates with the control object corresponding to the one device, executes a method embedded in the control object, and can control the one device.

For example, to control the printer unit 21, the application AP sends information related to control of the printer unit 21 to the printer interface object 43. The printer interface object 43 communicates using the printer control object and communication link K1, and sends information related to control of the printer unit 21 received from the application AP to the printer control object 56. The printer control object 56 controls the printer unit 21 based on the received information related to control of the printer unit 21.

By instantiation of this interface object, the application AP can control the device using methods of the control object through the interface object. More specifically, establishing control of a device by the application AP through the control device 11 is accomplished by instantiating an interface object in conjunction with instantiating a control object.

Instantiation of the barcode scanner control object 54 and barcode scanner interface object 41 is thus completed as described above. Control objects and interface objects for other devices are instantiated by the same steps.

As described above, this embodiment of the invention instantiates a corresponding interface object when instantiation of a control object in the control device 11 is completed. Thus comprised, a control object and interface object pair is always instantiated for any single device, and a state enabling device control by the application AP is established for each device.

An interface object and control object pair is also instantiated for each device connected to the control device 11 in this embodiment. As a result, by using functions of the interface object corresponding to the one device when controlling any one device, the application AP can reliably control the one device and can exchange data with the one device.

Development (programming) of the application AP is also simplified because a program associated with a software interface related to controlling a device needs only to consider the relationship to the interface object of each device. For example, routines of the application AP related to controlling the cash changer 13 only need to consider input and output of information (data) with the cash changer interface object 40, and development is simplified.

Figure 5:
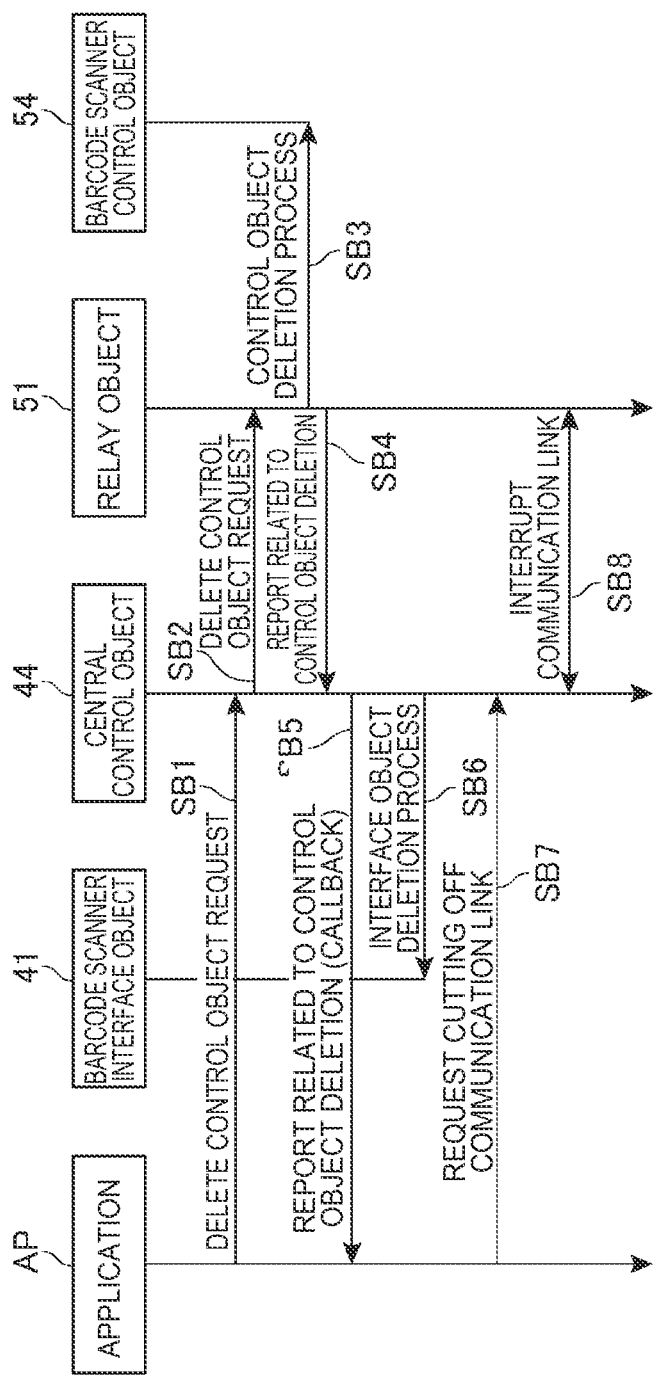
FIG. 5 is a flow chart of deleting control and interface objects.

A process for deleting an instantiated control object and interface object, and closing the established communication link, is described next with reference to FIG. 5. The example in the flow chart in FIG. 5 describes deleting a control object and interface object for the barcode scanner 12.

The application AP first asserts a delete request (cancel device control request) for the barcode scanner control object 54 (step SB1). The application AP also specifies the device ID of the barcode scanner 12. The control object delete request is executed by the application AP executing a method embedded in the central control object 44.

In response to the barcode scanner control object 54 delete request from the application AP, the central control object 44 sends a barcode scanner control object 54 delete request to the relay object 51 through the communication link K1 (step SB2).

In response to the delete request, the relay object 51 deletes the control object (the barcode scanner control object 54 in this example) corresponding to the specified device ID (the device ID "scanner" of the barcode scanner 12 in this example) using a delete operator, for example (step SB3). By deleting the control object, control of the barcode scanner 12 by the control device 11 is cancelled.

A specific control object can thus be deleted in this embodiment asserting a control object control request by the application AP. By deleting the control object for a specific device, control of the specific device by an application AP running on one tablet is cancelled, thereby enabling an application AP operating on a different tablet to take control of the specific device. As a result, when a specific device is no longer used, the application AP can release that device by deleting the control object for the specific device, and occupying a device unnecessarily can be prevented.

When deleting the barcode scanner control object 54 is completed, the relay object 51 reports to the central control object 44 through the communication link K1 that deleting the object was completed (step SB4), and the central control object 44 then passes that report to the application AP (step SB5).

Note that a callback that receives the result of the process related to deleting the control object is declared in step SB1, and successful deletion of the barcode scanner control object 54 is reported to the application AP by executing the callback function.

The central control object 44 then deletes the barcode scanner interface object 41 corresponding to the barcode scanner control object 54 that was deleted (step SB6).

Next, the application AP requests terminating the communication link K1 to the control device 11 (cancel communication request) (step SB7). This request is executed by the application AP executing a dedicated method embedded in the central control object 44.

In response to the request asserted in step SB7, the central control object 44 and relay object 51 terminate the communication link K1 established between the connection unit 45 and second communication unit 50 according to the Web-Socket standard (step SB8).

An instantiated control object and interface object can thus be deleted and an established communication link cancelled as described above.

An instantiated control object can thus be deleted at the desired time by a request from the application AP. More specifically, when maintaining control of a device by an application AP is no longer necessary, the application AP can quickly delete the control object instantiated for that one device and release control of that one device. Control objects remaining instantiated when no longer needed, and an application AP on another tablet unnecessarily continuing to be unable to control the device, can therefore be effectively prevented.

A specific example of operation in a transaction process is described next.

Before the transaction process executes, each tablet device 10 first executes the following processes.

More specifically, the checkout clerk or the person responsible for another task starts the browser of the tablet device 10, and instructs displaying a user interface UI (FIG. 6(A)) on the touch panel 30. The browser execution unit 26a of the terminal control unit 26 then accesses a specific address on the POS server 17 as instructed, acquires web page data such as an HTML file, and displays the user interface UI on the touch panel 30 based on the acquired data.

FIG. 6(A) shows an example of a user interface UI displayed on the touch panel 30.

A list area 65 displaying the names of products purchased by the customer, product prices, and product quantities is displayed in the user interface UI as shown in FIG. 6(A) in the upper left area. On the right beside the list area 65 is a transaction amount display area 66 where the total amount of the products purchased by the customer, the amount of money received from the customer for the transaction, and the amount of change due to the customer are displayed.

Below the list area 65 is a barcode information input field 67, which is an input field where information represented by the barcode read by the barcode scanner 12 ("barcode information" below) is input and displayed. The barcode information is basically identification information uniquely assigned to each type of a product. On the right side of the barcode information input field 67 is a virtual keypad 68. Information can be input through this virtual keypad 68 to each of the input fields in the user interface UI, and the virtual keypad 68 has keys for inputting information.

An address input field 69 where the accessed address is displayed is presented at the top of the user interface UI.

The process until the information expressed by the read barcode ("barcode information" below) is displayed in the barcode information input field 67 of the user interface UI after a barcode is read by the barcode scanner 12 is described first below.

Figure 7:
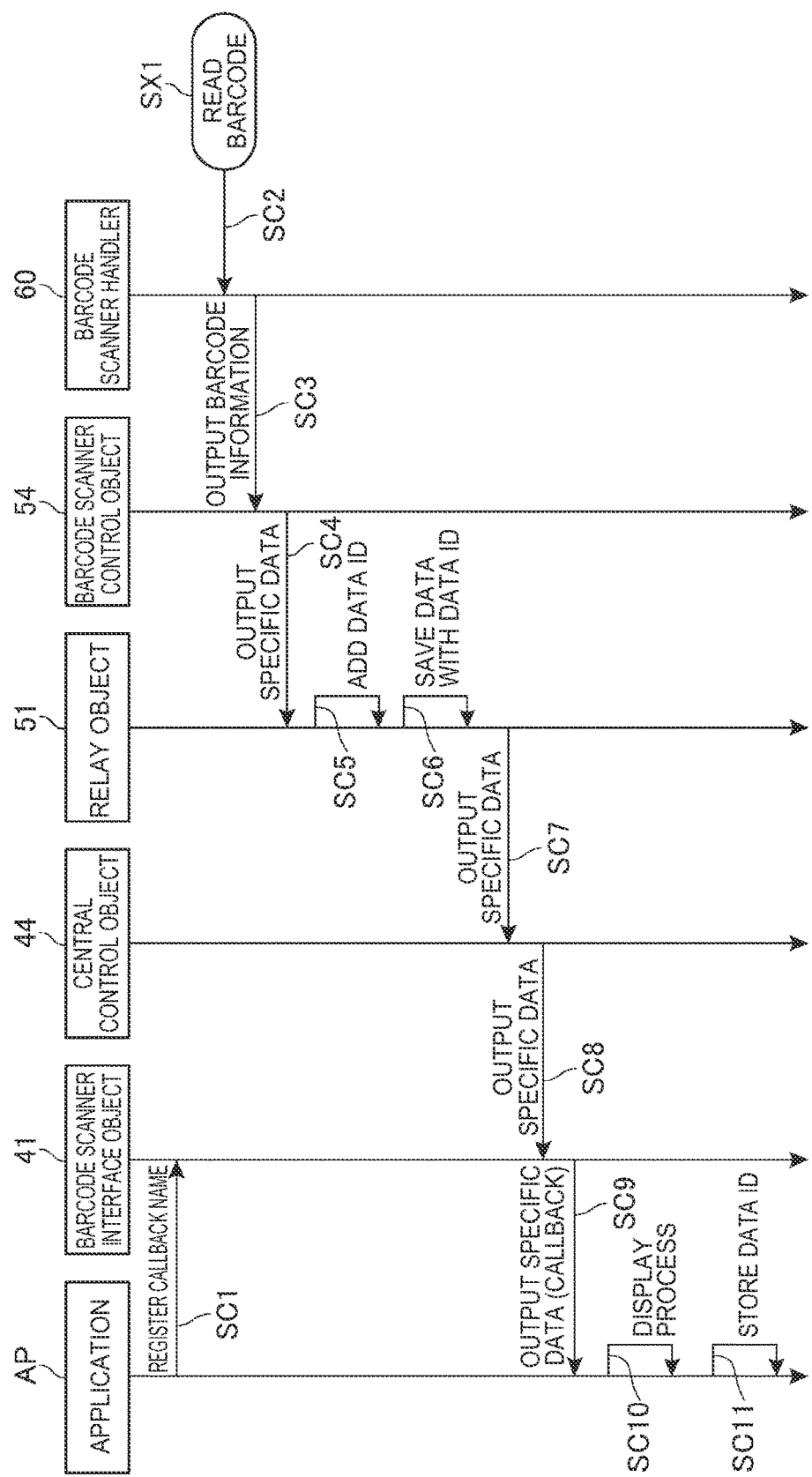
FIG. 7 is a flow chart of a process executed after a barcode is read by the barcode scanner.

FIG. 7 is a flow chart describing this process.

First, to enable the application AP to acquire the result of reading a barcode, a callback name for the barcode scanner interface object 41 is first registered by the application AP (step SC1). A callback name is an identification name assigned to each event (an event such as the barcode scanner 12 reading a barcode). When data linked to the callback name is sent to the interface object, a specific callback function is executed, and the data is sent to the application AP. In this example, the callback name of "reading a barcode with the barcode scanner 12" is "ondata."

At the checkout counter L, the checkout clerk uses the barcode scanner 12 to read the barcode from a product purchased by the customer (step SX1).

Next, the result of reading the barcode is input to the barcode scanner handler 60 (step SC2). The barcode scanner handler 60 then executes an interrupt process and sends the barcode information, which is the result of reading, to the barcode scanner control object 54 (step SC3).

Next, the barcode scanner control object 54 sends data including at least the device ID of the barcode scanner 12 (scanner in this example), the callback name (ondata in this example), and the barcode information (data) in a specific format to the relay object 51 (step SC4).

The relay object 51 generates a data ID (identification information), and adds the data ID in a predetermined format to the barcode information contained in the received data (step SC5). The data ID is identification information uniquely assigned to identify the data passed to the application AP (barcode information in this example). In this embodiment the data ID is a number, and the relay object 51 generates and assigns the data ID so that the value increases as the time that the data is sent to the central control object 44 becomes later. For example, if the data ID generated and assigned to the input barcode information and sent to the central control object 44 is 1, the data ID generated and assigned to the barcode information received next and sent to the central control object 44 is 2 (or any value other than 2 that is greater than 1). How the assigned data ID is used is described below.

Next, the relay object 51 stores the barcode information (data) of the assigned data ID to a specific storage area in the storage unit 22 (step SC6). As a result, data related to the device with the data ID sent to the application AP (information related to the device) is cumulatively stored in the storage unit 22.

Next, the relay object 51 sends data including at least the device ID of the barcode scanner 12 (scanner in this example), the callback name (ondata in this example), and the barcode information (data) with the data ID in a specific format to the central control object 44 (step SC7). The relay object 51 sends the data through the communication link K1 identified by the communication link ID assigned to the barcode scanner control object 54.

Next, the central control object 44 sends data to a specific interface object (barcode scanner interface object 41 in this example) related to the device ID contained in the received data (step SC8).

Based on the callback name (ondata in this example), the barcode scanner interface object 41 executes the specific callback function, and sends the barcode information with the data ID to the application AP (step SC9).

The application AP executes the display process based on the received barcode information, and displays the barcode information in the barcode information input field 67 (step SC10). As a result, as shown in FIG. 6(B), the barcode information is displayed in the barcode information input field 67.

Next, the application AP extracts the data ID from the received barcode information with an assigned data ID, and stores the data ID to a specific storage area in the terminal storage unit 25 (step SC11). This step SC11 results in the data IDs of the data sent to the application AP being extracted from the data output from the device (barcode information in this example) and accumulated in the terminal storage unit 25. A method of using the data IDs stored in the terminal storage unit 25 is described below.

Steps in a process whereby the application AP controls the printer unit 21 to produce a receipt is described next.

Figure 8:
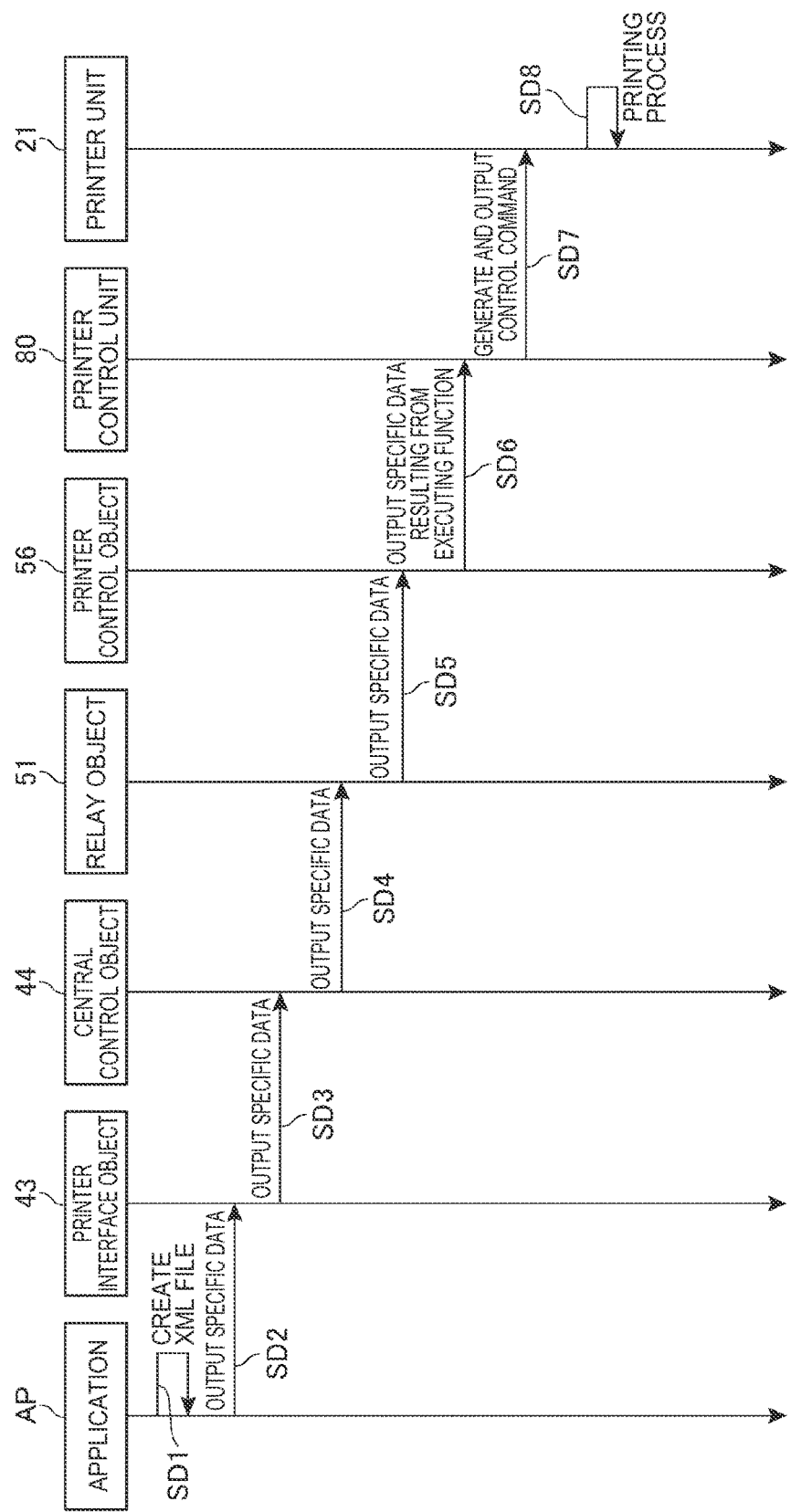
FIG. 8 is a flow chart of printing with the printer unit.

FIG. 8 is a flow chart describing the steps in this process.

First, the application AP generates an image to be printed on the receipt using an embedded function, and then based on the generated image creates an XML file (information related to a device) containing the information related to the receipt to be produced by the printer unit 21 (step SD1). Included in the XML file is the information for producing a receipt, such as the text and images to be printed on the receipt, in a specific format conforming to the XML format, and as described below, the printer control unit 80 can convert the XML file to control commands in the command language of the printer unit 21.

Next, the application AP sends data including at least the device ID of the printer unit 21, information specifying the functions to be executed by the printer control object 56, and the generated XML file, to the printer interface object 43 (step SD2). In this example, the function executed by the printer control object 56 is a function for executing a process that sends the XML file through the printer/display interface 81 to the printer control unit 80.

Next, the printer interface object 43 requests the printer control object 56 to send the data sent from the application AP to the central control object 44. (step SD3) The central control object 44 sends the data through the communication link K1 to the relay object 51 (step SD4), and the relay object 51 sends the data to the printer control object 56 (step SD5).

The printer control object 56 sends the XML file contained in the received data through the printer/display interface 81 to the printer control unit 80 by executing a function specified in the received data (step SD6). At this time the printer control object 56 sends the XML file to the printer control unit 80 after formatting or processing the data to enable processing by the printer control unit 80.

The printer control unit 80 is a function block rendered by a function of a so-called printer driver, and based on the received XML file, generates control commands conforming to the command language of the printer unit 21 and outputs to the printer unit 21 through the printer handler 63 (step SD7). The printer unit 21 then operates the required mechanisms to produce a receipt based on the received control commands (step SD8).

Note that displaying data on the display 14 is accomplished by a process of steps similar to those described in FIG. 8.

More specifically, the application AP sends display data to the display control object 55 through the display interface object 42. The display control object 55 sends the display data to the display control unit 82 through the printer/display interface 81. The display control unit 82 converts the received display data to control commands conforming to the command language of the display 14, and using a function of the display handler 62 outputs to the display 14. The display 14 then presents the display data based on the control commands.

As described above, device control by the application AP, and exchanging data between the application AP and a device, are achieved for each device by communication between an interface object and a control object corresponding to the target device.

More specifically, the tablet device 10 and control device 11 in this embodiment communicate according to the WebSocket standard. That is, any device can send data to another device without sending a data transmission request from the browser on the tablet device 10 to the control device 11 functioning as a server. In other words, two-way communication between the interface object and the corresponding control object is possible. As a result, as described using the flow chart in FIG. 7, triggered by an event on the device side, data can be sent smoothly from the device through the control object and interface object to the application AP. In addition, as described using the flow chart in FIG. 8, triggered by an event on the application AP side, the application AP can control a device through the interface object and the control object.

Furthermore, as described above, control of a particular device can be established by instantiating a control object for that device. More specifically, instantiating a control object establishes a state enabling data communication with the corresponding control object, thereby enabling the application AP to control the corresponding device to execute various processes, and enabling the corresponding device to send data to the application AP. As further described below, a control object can cause the device to execute a particular process by sending data output by the application AP to the device (or the control unit of the device), and can send a control command to the device in response to a request from the application AP to cause the device to execute a particular process.

More specifically, as described above, one function (method) of the barcode scanner control object 54 is a function (method) that, when a barcode is read by the corresponding barcode scanner 12, acquires the result of reading the barcode through an interrupt process, and sends the acquired reading result through the barcode scanner interface object 41 to the application AP. More specifically, the barcode scanner control object 54 can send the result of reading a barcode to the tablet device 10 based on the corresponding barcode scanner 12 reading the barcode. Establishing device control in this instance means establishing a state in which the result of reading by the corresponding barcode scanner 12 can be sent to the tablet device 10. These functions are enabled by instantiating a barcode scanner control object 54.

As described above, the printer control object 56 sends an XML file created by the application AP to the printer control unit 80 after formatting or converting the data to enable processing by the printer control unit 80. Based on data that is sent in a processable form, the printer control unit 80 generates and sends a control command, and produces a receipt (prints a receipt) with the printer unit 21. The printer control object 56 also acquires data output by the printer unit 21 (for example, data identifying the status (such as no paper or an error) of the printer unit 21) through the printer control unit 80. The printer control object 56 then sends the acquired data through the printer interface object 43 to the application AP. Establishing control of a device here thus means creating a state in which data can be sent from the tablet device 10 (application AP) to the corresponding printer unit 21, and a state in which the printer unit 21 can be controlled by the tablet device 10 (application AP) to execute printing and other processes. It also means establishing a state in which data can be sent at appropriate times from the corresponding printer unit 21 to the tablet device 10 (application AP). These functions can be achieved by instantiating a printer control object 56.

Control of a device can also be established by the display control object 55 similarly to the printer control object 56. More specifically, instantiating a display control object 55 establishes a state in which data can be sent from the tablet device 10 (application AP) to the corresponding display, and information can be displayed on the display 14 by the tablet device 10 (application AP). Instantiating a display control object 55 also establishes a state in which the display 14 can send data at the appropriate timing to the tablet device 10 (application AP).

Based on a request from the application AP, the cash changer control object 53 also generates and sends to the cash changer 13 a control command corresponding to the process to be executed, and causes the cash changer 13 to execute a deposit process, withdrawal process, or other process. Generating and sending this control command is done by the application AP executing a specific method. In other words, the tablet device 10 (application AP) can cause the cash changer 13 to execute a desired process by specifying a method embedded in the cash changer control object 53 through the cash changer interface object 40.

When counting is done by the cash changer 13, or when a deposit or withdrawal is made with the cash changer 13, the cash changer control object 53 acquires the result of that process by an interrupt process, and sends the acquired process result through the cash changer interface object 40 to the application AP.

More specifically, establishing device control in this instance means establishing a state in which data can be sent from the tablet device 10 (application AP) to the cash changer 13, and the tablet device 10 (application AP) can control the cash changer 13 to execute deposit and other processes. It also means establishing a state in which the corresponding cash changer 13 can send data to the tablet device 10 (application AP) at the appropriate time. These functions are achieved by instantiating a cash changer control object 53.

The tablet device 10 and control device 11 are connected to communicate wirelessly using a specific standard such as Ethernet®, but communication can be unintentionally temporarily cut off (interrupted) due to radio interference or other cause. Even when not using a wireless connection, communication can be temporarily interrupted by disconnection of the communication cable, a poor connection, or other cause.

In such instances, the tablet device 10 and control device 11 execute a process based on the existence of a control object as described below.

FIG. 9 is a flow chart of the operation of the tablet device 10 and control device 11 when communication is interrupted.

FIG. 9(A) shows the steps of a process of the application AP running on the tablet device 10, and FIG. 9(B) shows the process of the relay object 51 operating on the control device 11.

The flow chart in FIG. 9 assumes that a communication link K1 is already established between the tablet device 10 and control device 11, and control objects for the cash changer 13, barcode scanner 12, display 14, and printer unit 21 have been instantiated by the control device 11.

As shown in FIG. 9(A), the application AP monitors whether or not communication is interrupted (step SE1). Note that the connection unit 45 monitors if communication is interrupted by means conforming to the WebSocket standard, and when communication is cut off, the connection unit 45 reports the same to the application AP.

When communication is interrupted (step SE1 returns YES), the application AP attempts to reconnect using a function of the central control object 44, and determines if reconnecting was successful (step SE2). Attempting to reconnect continues for a predetermined period of time.

As shown in FIG. 9(B), the relay object 51 also monitors if the communication connection is broken (step SF1). Note that the second communication unit 50 monitors if communication is interrupted by a means conforming to the WebSocket standard, and when communication is interrupted, the second communication unit 50 reports the same to the application AP.

If communication is cut off (step SF1 returns YES), the relay object 51 starts counting the time since communication was interrupted (step SF2). As will be understood below, the relay object 51 is configured to delete the control object corresponding to the communication link ID associated with the interrupted communication link when the time past since communication was interrupted exceeds time T1. The length of time T1 is set to be a reference value enabling determining if the interruption of communication was an intentional interruption or an unintended breakdown.

After starting to count the elapsed time, the relay object 51 watches if the elapsed time has reached the time T1 (step SF4), and continues checking if reconnection was successful until time T1 is reached (step SF3).

If the elapsed time reaches time T1 without communication reconnecting (step SF4 returns YES), the interruption of communication can be determined to be an intentional shutdown and not a sudden failure. The relay object 51 then deletes the control objects corresponding to the communication link ID associated with the interrupted communication connection (in this example, the control objects of the cash changer 13, barcode scanner 12, display 14, and printer unit 21) (step SF5). As described above, deleting a control object releases the corresponding device to an application AP operating on another tablet, and enables another application AP to instantiate a new control object and control the corresponding device.

If communication between the control device 11 and a tablet device 10 (which could be the same terminal as before communication was interrupted, or a different terminal) is established again after a control object is deleted, the device controller 20a instantiates and operates a control object based on a request from the tablet device 10 according to the process described in FIG. 4. As a result, controlling a device can be quickly enabled even when reconnecting is not successful within the specific time after communication is interrupted, and the corresponding control object was therefore deleted.

This embodiment thus determines that an interruption of communication was intentional and deletes the control object (releases the control object) if the elapsed time reaches time T1 without successfully re-establishing communication. As a result, the time for which another application AP cannot control a device is prevented from continuing for an unnecessarily long time.

Referring again to FIG. 9(A), if reconnecting is successful as a result of attempting to reconnect in step SE2 (step SE2 returns YES), the application AP sends the communication link ID of the communication link K1 associated with the communication connection that was interrupted to the relay object 51 (step SE3). As described in step SA3 in FIG. 4, a communication link ID is assigned in conjunction with establishing a communication link K1, and is stored in a specific storage area in the terminal storage unit 25 in a format enabling referencing by the application AP.

Referring to FIG. 9(B), because YES is returned by decision step SF3 when re-establishing communication is successful, and the communication link ID of the communication link K1 associated with the interrupted connection is sent by the application AP in step SE3, the relay object 51 receives the communication link ID (step SF6).

When the communication link ID is received, the relay object 51 determines if a control object corresponding to the received communication link ID already exists (step SF7). If the control object does not exist (step SF7 returns NO), the relay object 51 ends the process.

However, if a control object corresponding to the received communication link ID already exists (step SF7 returns YES), the relay object 51 cancels deleting these control objects after time T1, and keeps the control objects instantiated instead of deleting them (controls control object instantiation) (step SF8).

When a communication link is re-established within time T1 after communication is interrupted, this embodiment of the invention determines that the probability the interruption of communication was an unintended sudden failure is high, and maintains the control objects related to the communication link ID of the communication link K1 through which communication was interrupted. As a result, the application AP can quickly and efficiently control a device without instantiating a new control object to control the device. In addition, when one application AP controls a device, device control will not be released to another application AP (the corresponding control object will not be deleted) and device control will not be taken over by that other application AP in the event of a sudden communication failure.

After cancelling deletion of the control object (control of control object instantiation) in step SF8, the application AP and relay object 51 work together to send data again (step SE4, step SF9).

Figure 10A:
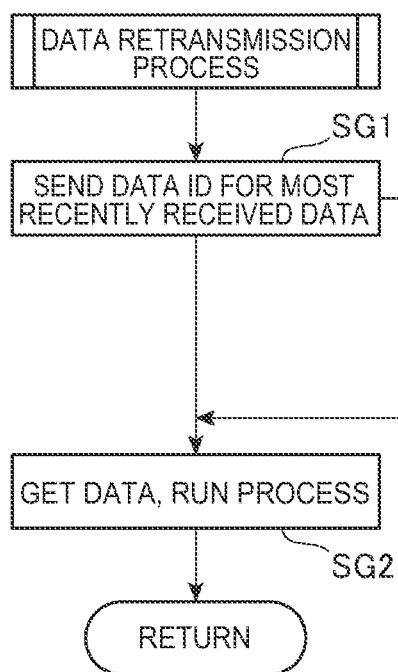
FIGS. 10(A) and 10(B) are flow charts showing the operation of a tablet terminal and a control device.
Figure 10B:
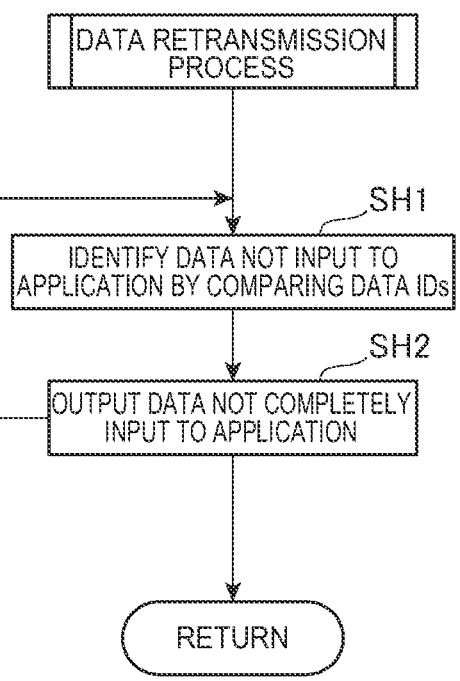

FIG. 10 is a flow chart of application AP and relay object 51 operation in the data retransmission process, (A) showing the process of the application AP and (B) showing the process of the relay object 51.

Referring to FIG. 10(A), the application AP sends the data ID of the most recently received data in the data IDs stored in the terminal storage unit 25 to the relay object 51 (step SG1). As described with reference to step SC11 in FIG. 7, a data ID is assigned to the device data (information related to a device) received by the application AP, and when the data is received, the application AP extracts the data ID from the barcode information with the received data ID, and stores the data ID in a specific storage area in the terminal storage unit 25.

When a data ID is received from the application AP, the relay object 51 compares the data IDs of the data stored with a data ID in the storage unit 22 with the data ID received from the application AP, and identifies (determines) if the data is data that was to be sent to the application AP but was not sent to the application AP due to a sudden communication failure (step SH1). More specifically, the relay object 51 generates data IDs based on the rule that the value of the data ID increases as the time when the data is sent to the application AP becomes later. Based on this, the relay object 51 knows that data having the same data ID as the data ID received from the application AP was transmitted successfully. However, data having a data ID with a value greater than the received data ID is data that has not been transmitted to the application AP due a sudden communication failure, and is identified as data that has not been transmitted to the application AP. More specifically, in step SH1 the relay object 51 identifies the data ID of data that has not been transmitted normally to the tablet device 10 by determining if the data IDs assigned to data sent to the tablet device 10 include a data ID that is not stored in the tablet device 10.

Next, the relay object 51 sends to the application AP data (device-related information) that has not been transmitted (step SH2). The application AP gets and appropriately processes the data transmitted by the relay object 51 (step SG2).

By executing this data retransmission process, all data that should be output to the application AP can be output to the application AP without data loss even when communication is momentarily interrupted.

As described above, a POS system 1 (control system) according to this embodiment of the invention includes a tablet device 10 (terminal) that runs a browser, and a control device 11 that is communicatively connected to the tablet device 10 and exchanges data with the tablet device 10. The tablet device 10 and control device 11 store identification information related to the communication connection when communicatively connected, and when the communication connection is re-established after communication is cut off, communication is connected based on the identification information related to the communication connection stored by the tablet device 10 and control device 11.

Thus comprised, the tablet device 10 and control device 11 store identification information identifying the connection when a connection is established between the tablet device 10 and control device 11, and when re-establishing a connection after the connection is interrupted, reconnect based on the identification information. As a result, when re-connecting, the identification information can be used as needed to reconnect compatibly with the connection before it was interrupted. In other words, thus comprised, a POS system 1 in which a tablet device 10 having a browser and a control device 11 communicate through a network can be made compatible with configurations in which devices communicate through a network.

In addition, identification information about a communication connection in this embodiment is identification information assigned to the communication link between the tablet device 10 and control device 11.

Thus comprised, based on establishing a communication link between the tablet device 10 and control device 11, the identification information for the communication link can be used to reconnect.

The POS system 1 according to this embodiment has a device connected to a control device 11. The control device 11 has a device controller 20*a* that instantiates a control object to control the device, and a storage unit 22 that relationally stores identification information for the communication connection to the control object instantiated by the device controller 20*a*.

Thus comprised, individual devices can be managed relationally to the identification information.

The device controller 20*a* in this embodiment also deletes the control object if a connection is not re-established within a predetermined time after the communication connection between the tablet device 10 and control device 11 is cut off.

Thus comprised, when there is a temporary interruption resulting in reconnection within a predetermined time after a connection is broken, deleting the control object that was using the connection before it was broken is prevented, and the control object can be used without instantiating the control object again after reconnecting. A control object not being deleted for an unnecessarily long time, and control of the device therefore not being released, can also be prevented.

In this embodiment, when communication is reconnected within a predetermined time after the communication connection between a tablet device 10 and control device 11 is broken, the device controller 20*a* controls instantiation of a control object based the identification information of the re-established connection and the identification information related to the control objects stored in the storage unit 22.

Thus comprised, the control object being used with the connection that was interrupted can be determined and re-used by using the identification information as the search key after reconnecting from a temporary interruption.

A POS system 1 (control system) according to this embodiment includes a device that sends data; a control device 11 including a first communication unit 71 that communicates with the device and receives data sent by the device, a device controller 20*a* that assigns identification information to the data received by the first communication unit 71, a storage unit 22 that stores the data with the assigned identification information, and a second communication unit 50 that sends the data with the assigned identification information; and a tablet device 10 that runs a browser and includes a connection unit 45 that receives the data with the assigned identification information sent from the control device 11, a terminal storage unit 25 that stores the identification information of the data with the assigned identification information received by the connection unit 45, and a terminal control unit 26 that runs an application that processes the data with the assigned identification information.

Thus comprised, identification information is assigned to data sent from the control device 11 to the terminal, the control device 11 stores the transmitted data, and the terminal stores the identification information of the received data. As a result, when the connection is broken, the identification information can be used as a key to identify data that the terminal has not received due to interruption of the connection, and the identified data can be retransmitted. More specifically, this embodiment of the invention can make a control system in which a terminal with a browser and a control device communicate through a network compatible with configurations in which devices communicate through a network.

When connection is re-established after communication between the tablet device 10 and control device 11 is interrupted, the tablet device 10 in this embodiment sends the stored identification information to the control device 11, the device controller 20a of the control device 11 identifies data to which identification information not stored by the tablet device 10 is assigned based on the identification information sent from the tablet device 10 and the identification information of the data with assigned identification information stored in the storage unit 22, and the second communication unit 50 of the control device 11 sends data with assigned identification information that is not stored in the tablet device 10.

Thus comprised, the identification information can be used to determine data that has not been received by the tablet device 10 when reconnecting after the connection is broken.

In this embodiment of the invention, the identification information assigned by the device controller 20a of the control device 11 is rule-based information, and based on the rule of the identification information, the device controller 20a identifies data with assigned identification information not stored by the tablet device 10.

Thus comprised, the control device 11 can identify data the tablet device 10 has not received by a simple means using the rule-based regularity of the identification information instead of executing a process of the tablet device 10 sending identification information for all data received within a specific period to the control device 11, and the control device 11 identifying data that the tablet device 10 has not received by comparing the received identification information and the identification information in the data with stored identification information.

A control device 11 according to this embodiment includes a first communication unit 71 that connects to a device and communicates with the device; a second communication unit 50 that is connected to a tablet device 10 that runs a browser and receives requests from the tablet device 10; and a device controller 20a that uses a control object to control the device based on a request from the tablet device 10, and deletes the control object after holding the control object for a specific time when the communication connection with the tablet device 10 is broken.

Thus comprised, the control object is not deleted immediately when communication is interrupted, and is instead deleted after being held for a specific time. As a result, the control object is not immediately deleted when communication is temporarily interrupted unintentionally, and when communication is restored after the temporary interruption, control of the device can start using the control object that was not deleted and remains instantiated. Furthermore, because the control object is deleted after remaining instantiated for a specific time, the control object not being deleted for an unnecessarily long time and control of a device therefore not being released is prevented. In other words, with this configuration of the invention, a POS system 1 in which a tablet device 10 having a browser and a control device 11 communicate through a network can be made compatible with a configuration in which the control device 11 communicates with other devices through a network.

When the communication connection with the tablet device 10 is interrupted and communication with the tablet device 10 is then established after time exceeding a specific threshold has past, the device controller 20a in this embodiment instantiates and executes a control object based on a request from the tablet device 10.

Thus comprised, when reconnection is not successful within a specific time after communication is interrupted and a control object is therefore deleted, a control object is instantiated based on the request of the tablet device 10, and a state enabling control of a device can be quickly established.

A control object executed by the device controller 20a in this embodiment converts a request sent from a tablet device 10 to data that is sent to a device through the first communication unit 71.

Thus comprised, a request can be output from the terminal to a device and the device can be controlled using a function of the control object.

The invention is described above with reference to a preferred embodiment thereof, but the invention is not limited thereto and can be modified and adapted in many ways without departing from the scope of the accompanying claims.

For example, the invention is described in the foregoing embodiment using a POS system 1 in a store with a checkout counter L as an example, but the POS system is not limited to such use, and can be used in the hospitality industry in coffee shops and restaurants, for example. The control device 11 and POS server 17 are also separate devices above, but the function of the POS server 17 could be included in the control device 11. Yet further, the control device 11 is a thermal printer above, but any desirable recording method can be used.

The function blocks shown in FIG. 2 and FIG. 3 can be desirably achieved by the cooperation of hardware and software, and do not suggest a specific hardware configuration. The devices may also operate by running a program stored on an externally connected storage medium.

INDUSTRIAL APPLICABILITY

As described above, the invention is useful in a POS terminal to which a tablet device or other terminal is connected, and a POS system using the POS terminal, and can be used in information processing devices and information processing systems such as POS systems.

REFERENCE SIGNS LIST

1 POS system (control system)
10 tablet device (terminal)
11 control device
12 barcode scanner (device)
13 cash changer (device)
14 display (device)
20a device controller
21 printer unit (device)
22 storage unit
25 terminal storage unit
26 terminal control unit
45 connection unit
50 second communication unit
53 cash changer control object (control object)
54 barcode scanner control object (control object)
55 display control object (control object)
56 printer control object (control object)
71 first communication unit
K1 communication link

The invention claimed is:

1. A control system comprising:
a device configured to transmit device data;
a control device including:
  a first communication unit, configured to communicate with the device and to receive the device data,
  a device controller configured to assign device data identification information to the device data received by the first communication unit,
  a storage unit configured to store the device data and the assigned device data identification information, and
  a second communication unit configured to transmit the device data and the assigned device data identification information; and
a terminal on which a browser runs, the terminal including:
  a connection unit, configured to receive the device data and the assigned device data identification information transmitted by the control device,
  a terminal storage unit configured to store the device data identification information and the assigned device data identification information received by the connection unit, and
  a terminal control unit configured to run an application that processes the device data and the assigned identification information,
wherein the terminal is configured to transmit the device data identification information stored in the terminal storage unit to the control device as part of a re-connection process;
the control device is configured to receive the device data identification information transmitted by the terminal as part of the re-connection process;
the device controller of the control device is further configured to:
  compare identification information of to-be-transmitted device data stored in the storage unit of the control device with the device data identification information received from the terminal; and
    determine, based on the comparison, that the identification information of the to-be-transmitted device data does not match the device data identification information received from the terminal; and
the second communication unit of the control device is further configured to transmit the to-be-transmitted device data responsive to the determination that the identification information of the to-be-transmitted device data does not match the device data identification information received from the terminal.

2. The control system described in claim 1, wherein the device controller of the control device is further configured to:
assign device data identification information based on one or more rules; and
determine, based on the device data identification information of the to-be-transmitted data and based on the one or more rules for assigning the device data identification information, that the to-be-transmitted data was not successfully transmitted to the terminal.

3. A control method of a control system, comprising:
assigning, by a control device, device data identification information to device data received from a connected device,
storing, by the control device, the device data and the assigned device data identification information;
transmitting, by the control device, the device data and the assigned device data identification information to a terminal; and
receiving, by the control device, the device data identification information from the terminal as part of a re-connection process;
comparing, by the control device, identification information of to-be-transmitted device data stored in the storage unit of the control device with the device data identification information received from the terminal as part of the re-connection process;
determining, by the control device, based on the comparison, that the identification information of the to-be-transmitted device data does not match the device data identification information received from the terminal; and
transmitting, to the terminal, the to-be-transmitted device data responsive to the determination that the identification information of the to-be-transmitted device data does not match the device data identification information received from the terminal.

* * * * *